United States Patent
Sakai

(10) Patent No.: US 8,260,251 B2
(45) Date of Patent: Sep. 4, 2012

(54) IN-VEHICLE EMERGENCY CALL APPARATUS

(75) Inventor: Hiroshi Sakai, Okazaki (JP)

(73) Assignee: Denso Corporation, Kariya (JP)

( * ) Notice: Subject to any disclaimer, the term of this patent is extended or adjusted under 35 U.S.C. 154(b) by 980 days.

(21) Appl. No.: 11/901,930

(22) Filed: Sep. 19, 2007

(65) Prior Publication Data

US 2008/0076384 A1    Mar. 27, 2008

(30) Foreign Application Priority Data

Sep. 22, 2006  (JP) ................. 2006-257174

(51) Int. Cl.
*H04M 11/04* (2006.01)
*B60Q 1/00* (2006.01)

(52) U.S. Cl. ............... 455/404.2; 455/404.1; 340/425.5; 340/436; 379/1.01

(58) Field of Classification Search ............... 455/404.2, 455/432, 404.1, 456.1–457; 340/635; 379/1.01–35
See application file for complete search history.

(56) References Cited

U.S. PATENT DOCUMENTS

| | | | |
|---|---|---|---|
| 5,686,910 A * | 11/1997 | Timm et al. | 340/988 |
| 6,223,852 B1 * | 5/2001 | Mukai et al. | 180/446 |
| 7,729,945 B1 * | 6/2010 | Katz et al. | 705/26 |
| 2003/0137409 A1 * | 7/2003 | Kikkawa et al. | 340/426.11 |
| 2006/0293812 A1 | 12/2006 | Koie | |

FOREIGN PATENT DOCUMENTS

| | | |
|---|---|---|
| JP | 08-301073 | 11/1996 |
| JP | 2002-029364 | 1/2002 |

* cited by examiner

*Primary Examiner* — George Eng
*Assistant Examiner* — Jing Gao
(74) *Attorney, Agent, or Firm* — Harness, Dickey & Pierce, PLC

(57) ABSTRACT

An in-vehicle emergency call apparatus takes in positioning data from a GPS receiver instead of from a navigation system. If the positioning data from the GPS receiver changes when the input of the ignition signal is off, the in-vehicle emergency call apparatus determines that the ignition signal breaks down, and failure of the ignition signal is reported to the user.

9 Claims, 2 Drawing Sheets

IN-VEHICLE EMERGENCY CALL APPARATUS

CROSS REFERENCE TO RELATED APPLICATION

This application is based on and incorporates herein by reference Japanese Patent Application No. 2006-257174 filed on Sep. 22, 2006.

FIELD OF THE INVENTION

This invention relates to an in-vehicle emergency call apparatus (or in-vehicle emergency communicator). The emergency call apparatus acquires positioning data indicating a current position. If a start trigger of an emergency call occurs on condition that an input of an ignition signal is on, an emergency call signal including the positioning data is transmitted to a service center.

BACKGROUND OF THE INVENTION

For example, an in-vehicle emergency call apparatus transmits an emergency call signal to a service center, when an air bag is developed. When an input of an ignition signal is off, air bag expansion signals are assumed to be indeterminate values. That is, air bag expansion signals are determined only when the input of an ignition signal is on. However, with such a configuration, for example, if a communication line or channel is disconnected to thereby stop an ignition signal, determination of air bag expansion signals becomes impossible. Thus, even if an air bag is developed, emergency call operation may be unable to be performed.

On the other hand, multiple communication channels of an ignition signal are prepared in Patent document 1. In Patent document 1, even if one communication channel of an ignition signal is disconnected, other communication channels may be normal. Thus, when an air bag is developed, emergency call operation may be performed appropriately. Therefore, it is thought that the above-mentioned problem is solvable. However, now, providing multiple communication channels of an ignition signal requires an additional circuit for the exclusive use.

To that end, the applicant paid attention to the following: an in-vehicle emergency call apparatus receives travel state information from a navigation system, which may be mounted in the subject vehicle; and change in the received travel state information means that an output of an ignition signal must be on. Therefore, when the input of an ignition signal is off, whether the ignition signal fails (or breaks down) can be determined based on whether the travel state information received from the navigation system changes (see Patent document 2).

However, another in-vehicle emergency call apparatus may not receive travel state information from a navigation system. For example, it does not have an interface with a navigation system, or it may not connect with a navigation system.

Patent document 1: JP-2002-29364 A
Patent document 2: JP-2007-4546 A (US-20060293812 A1)

SUMMARY OF THE INVENTION

The present invention is made in view of the above-mentioned situation. It is an object to determine appropriately whether an ignition signal breaks down, without providing multiple communication channels of an ignition signal in the configuration which does not receive travel state information from a navigation system. Further, it is an object to provide an in-vehicle emergency call apparatus capable of appropriately informing a user that the ignition signal breaks down.

To achieve the above object, according to an example of the present invention, an emergency call apparatus for a vehicle is provided as follows. A positioning unit is configured to acquire positioning data indicating a current position. A control unit is configured to transmit to a service center an emergency call signal including the positioning data acquired by the positioning unit when a start trigger occurs, on condition that an input of an ignition signal is on. A positioning data comparing unit is configured to compare current positioning data with previous positioning data, both positioning data being acquired by the positioning unit when an input of the ignition signal is off and at different time points separated from each other by a predetermined time period. Here, the control unit determines and reports that the ignition signal fails, when the positioning data comparing unit determines that the current positioning data changes from the previous positioning data.

As another example of the present invention, a method is provided for informing a failure of an ignition signal in a vehicle. The method comprises: performing a first determination for an ignition signal being off; taking in first positioning data indicating a current position of the vehicle after the first determination; performing a second determination for an ignition signal being off after acquiring the first positioning data; taking in second positioning data indicating a current position of the vehicle after the second determination; determining whether the first and second positioning data change from each other by more than a predetermined value; and determining a failure of the ignition signal when it is determined that the first and second positioning data change from each other by more than the predetermined value.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
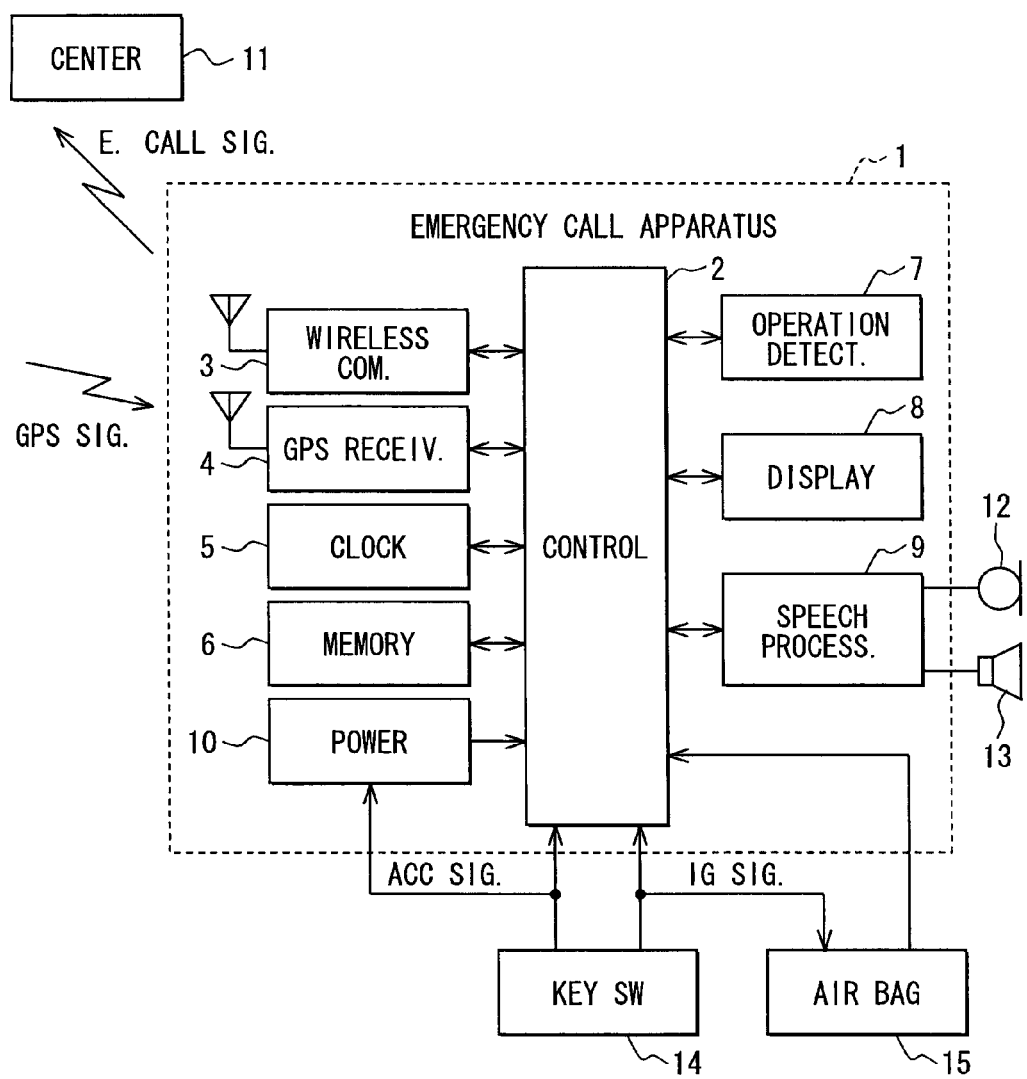
FIG. 1 is a functional block diagram showing an in-vehicle emergency call apparatus according to an embodiment of the present invention.

Hereafter, an embodiment of the present invention is described with reference to drawings. FIG. 1 is a functional block diagram showing a configuration of in-vehicle emergency call apparatus as the embodiment.

The in-vehicle emergency call apparatus 1 includes a control unit 2, a wireless communication unit 3, a GPS receiver 4, a clock unit 5, a memory unit 6, an operation detection unit 7, a display unit 8, a speech processor 9, and a power unit 10.

The control unit 2 includes a CPU to control overall operation of the in-vehicle emergency call apparatus 1. The wireless communication unit 3, which may function as a transmission means or unit, transmits an emergency call signal to a service center 11 through a wireless communication network, if an emergency call instruction signal is inputted from the control unit 2. In this case, a variety of information, including an identification code for identifying the in-vehicle emergency call apparatus 1 and a current position of the apparatus 1 (or relevant vehicle), is stored in an emergency call signal.

When GPS signals transmitted from GPS Satellites are received, the GPS receiver 4, which may function as a positioning means or unit, extracts and calculates a parameter from the GPS signals to thereby acquire positioning data showing a current position of the apparatus 1. The clock unit 5 performs a timing operation when an instruction for timing is inputted from the control unit 2. The memory unit 6 stores various kinds of memory information. When the operation detection unit 7 detects that a user operates an emergency call button, it outputs an operation detection signal to the control unit 2. The display unit 8, which may function as an informing means or unit, displays display information according to a display instruction signal inputted from the control unit 2.

The speech processor 9 converts sounds inputted via the microphone 12 to signals, and converts signals to sounds to be outputted via the speaker 13. In this embodiment, the in-vehicle emergency call apparatus 1 transmits the emergency call signal to the service center 11. The communication line is thereby established between the in-vehicle emergency call apparatus 1 and the service center 11. The user can communicate with an operator in the service center 11 using the microphone 12 and the speaker 13. Therefore, rescue can be demanded orally or the degree of an accident can be reported by the user.

The power unit 10 controls supply of operation power to each above-mentioned functional block. When an input of the accessory (ACC) signal is off, operation power is supplied to limited functional blocks such as the control unit 2 and the wireless communication unit 3, thereby performing low power operation in the in-vehicle emergency call apparatus 1. On the other hand, when the input of the accessory signal is on, operation power is supplied to all the functional blocks, thereby performing normal operation in the in-vehicle emergency call apparatus 1.

The key switch 14 includes the ignition (IG) switch and the accessory switch. While the ignition signal showing turning on and off of the ignition switch is outputted to the control unit 2 and the airbag system 15, the accessory signal showing turning on and off of the accessory switch is outputted to the control unit 2 and the power unit 10. When the air bag is developed, the airbag system 15 outputs an air bag expansion signal to the control unit 2, on condition that the input of the ignition signal from the key switch 14 is on.

In addition, in the above-mentioned configuration, the in-vehicle emergency call apparatus 1 may be achieved in a modular form. Moreover, in this embodiment, the control unit 2 starts emergency call operation by the following start triggers: (i) in connection with the user having operated the emergency call button, the operation detection signal is inputted from the operation detection unit 7; and (ii) an air bag expansion signal is inputted from the airbag system 15.

When an output of the ignition signal from the key switch 14 is on, the input of the ignition signal to the control unit 2 and airbag system 15 may be also on if failure does not occur in the communication line of the ignition signal. On the other hand, if failure occurs in the communication line of the ignition signal (if it disconnects, for example), the input of the ignition signal to the control unit 2 and airbag system 15 is off although the output of the ignition signal from the key switch 14 is on.

Figure 2:
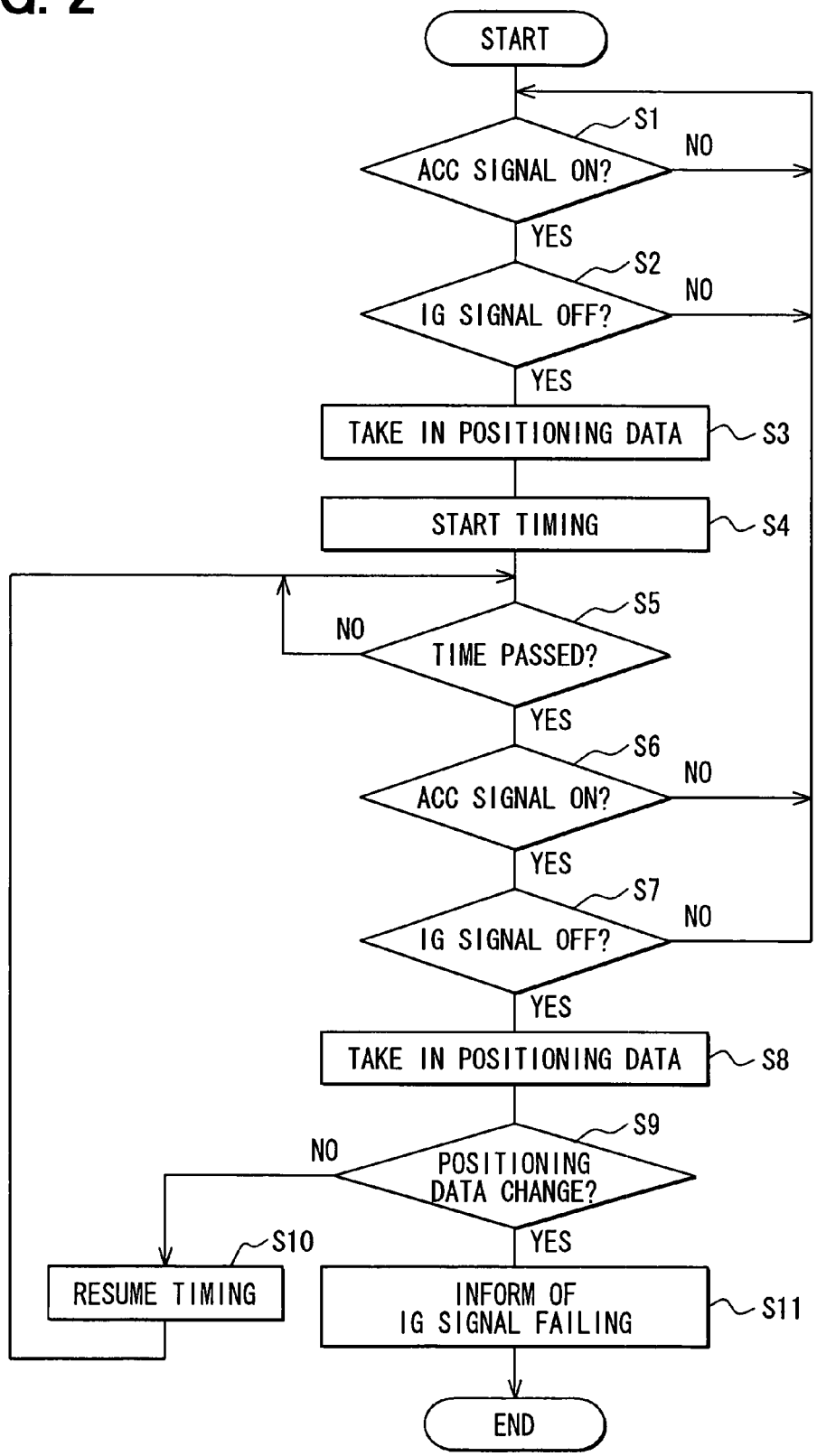
FIG. 2 is a flow chart diagram.

Next, an operation of the configuration described above is explained with reference to FIG. 2. Here, when the accessory signal is on, the GPS receiver 4 acquires positioning data periodically. In the in-vehicle emergency call apparatus 1, when the input of the accessory signal from the key switch 14 is off, the control unit 2 determines whether the input of the accessory signal from the key switch 14 changes from off to on (Step S1). When it is determined that the input of the accessory signal from the key switch 14 changes from off to on ("YES" at Step S1), the control unit 2 determines whether the input of the ignition signal from the key switch 14 is off (Step S2).

Subsequently, when the control unit 2 determines that the input of the ignition signal from the key switch 14 is off ("YES" at Step S2), the control unit 2 takes in positioning data which the GPS receiver 4 acquires at the time (Step S3). Timing for a prescribed period is then started by the clock unit 5 (Step S4).

Subsequently, when the control unit 2 determines that the prescribed period passes ("YES" at Step S5), it determines whether the input of the accessory signal from the key switch 14 continues on (Step S6). When it is determined that the input of the accessory signal from the key switch 14 continues on ("YES" at Step S6), it is determined again whether the input of the ignition signal from the key switch 14 is off (Step S7).

Subsequently, when the control unit 2 determines that the input of the ignition signal from the key switch 14 is off ("YES" at Step S7), the control unit 2 takes in positioning data that the GPS receiver 4 acquires at the time (Step S8) as current positioning data. And the control unit 2 compares the current positioning data with the previous positioning data taken in at Step S3, and determines whether the current positioning data changes from the previous positioning data (Step S9). Here, the control unit 2 may function as a positioning data comparing means or unit at Step S9.

Here, when the control unit 2 determines that the current positioning data does not change from the previous positioning data ("NO" at Step S9), it causes the clock unit 5 to resume timing for the prescribed period (Step S10). The processing after the above-mentioned Step S5 is repeatedly performed. In addition, the control unit 2 then uses the current positioning data as the previous positioning data while using positioning data taken in from the GPS receiver 4 next as current positioning data. It is thereby repeatedly determined whether the current positioning data changes from the previous positioning data.

On the other hand, when the control unit 2 determines that the current positioning data changes from the previous positioning data ("YES" at Step S9). This means that the output of the ignition signal must be on. In other words, it is determined that the output of the ignition signal from the key switch 14 is on although the input of the ignition signal is off. That is, it determines that the communication line of the ignition signal is disconnected, for example, and the ignition signal breaks down. A display guidance (for example, textual or visible information "Ignition signal failure") is displayed on the display unit 8 (Step S11).

As explained above, according to this embodiment, when the input of the ignition signal is off, and the positioning data, which the GPS receiver 4 positions and acquires, changes in the in-vehicle emergency call apparatus 1, the display guidance which indicates that the ignition signal breaks down is displayed. Thus, It can be determined appropriately whether the ignition signal breaks down, without providing multiple communication channels of the ignition signal in the configuration which does not receive positioning data from a navigation system. Further, the user can be suitable informed that the ignition signal breaks down.

The present invention is not limited only to the above-mentioned embodiment, and can be modified or extended as follows.

It is not limited to the configuration in which the GPS receiver 4 calculates the parameter extracted from the GPS signal to thereby acquire the positioning data. The GPS receiver 4 may output the parameter extracted from the GPS signal to the control unit 2, and the control unit 2 may calculate the parameter inputted from the GPS receiver 4 to thereby acquire the positioning data.

Moreover, when the accessory signal is on, the GPS receiver 4 does not need to acquire the positioning data periodically. The positioning data may be acquired from the control unit 2 on condition that the GPS receiver 4 receives a positioning instruction signal.

To inform the user of the ignition signal having broken down, it is not limited to displaying the display guidance. A voice guidance may be outputted, and the voice guidance may be outputted along with the display guidance displayed in the display unit 8.

Moreover, the service center may be informed of the ignition signal having broken down as failure information. The current and previous positioning data compared with each other by the control unit 2 may be positioning data acquired just before the input of the ignition signal changes from on to off and positioning data acquired after a predetermined time period from when the input of the ignition signal changes from on to off.

The start trigger of the emergency call may be dependent on another system other than the airbag system 15.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As an aspect, an emergency call apparatus for a vehicle is provided as follows. A positioning unit is configured to acquire positioning data indicating a current position. A control unit is configured to transmit to a service center an emergency call signal including the positioning data acquired by the positioning unit when a start trigger occurs, on condition that an input of an ignition signal is on. A positioning data comparing unit is configured to compare current positioning data with previous positioning data, both positioning data being acquired by the positioning unit when an input of the ignition signal is off and at different time points separated from each other by a predetermined time period. Here, the control unit determines and reports that the ignition signal fails, when the positioning data comparing unit determines that the current positioning data changes from the previous positioning data.

Thus, whether the ignition signal breaks down or not is determined by using the positioning data which the positioning unit positions not using positioning data received from a navigation system. In the configuration which does not receive the positioning data from the navigation system, it can be determined appropriately whether the ignition signal breaks down, without need of providing multiple communication channels of an ignition signal. Further, when the ignition signal breaking down is detected, this failure detection is reported to a user to thereby allow the user to suitably know the failure of the ignition signal. Here, that the ignition signal breaks down or fails means, for instance, that an output of the ignition signal is on but an input of the ignition signal is off due to a communication channel being broken off.

Further, as an optional feature of the above aspect of the emergency call apparatus, the first and second positioning data are taken in by the positioning data comparing unit from the positioning unit without a navigation apparatus intermediated.

As another aspect, a method is provided for informing a failure of an ignition signal in a vehicle. The method comprises: performing a first determination for an ignition signal being off; taking in first positioning data indicating a current position of the vehicle after the first determination; performing a second determination for an ignition signal being off after acquiring the first positioning data; taking in second positioning data indicating a current position of the vehicle after the second determination; determining whether the first and second positioning data change from each other by more than a predetermined value; and determining a failure of the ignition signal when it is determined that the first and second positioning data change from each other by more than the predetermined value. This configuration can detect a failure of an ignition signal, for example, disconnecting of a communication channel for transmitting the ignition signal, by determining time-basis change in the positioning data acquired by the positioning unit without a navigation apparatus intermediated.

As an optional feature, the above method may be cooperative with a different method provided in the vehicle for transmitting to a service center an emergency call signal including positioning data of the vehicle when a start trigger occurs, on condition that an input of an ignition signal is on; and the positioning data are taken in from a positioning unit provided in the vehicle without using a navigation apparatus.

It will be obvious to those skilled in the art that various changes may be made in the above-described embodiments of the present invention. However, the scope of the present invention should be determined by the following claims.

What is claimed is:

1. An emergency call apparatus in combination with a vehicle having an air bag system, the combination comprising: means for supplying an ignition signal indicating status of an ignition switch in the vehicle to the emergency call apparatus and the air bag system; a GPS receiver configured to acquire positioning data which indicates a current position based on GPS signals from GPS satellites; a control unit configured to transmit to a service center an emergency call signal including the positioning data acquired by the GPS receiver when a start trigger occurs, on condition that the ignition signal indicates that the ignition switch is on; and a positioning data comparing unit configured to compare first positioning data with second positioning data, both positioning data being acquired by the GPS receiver when the ignition signal indicates that the ignition switch is off and at different time points separated from each other by a time period exceeding a prescribed time period, wherein the control unit determines and reports to a user that the supplying means has failed, in cases that (i) the positioning data comparing unit determines that the first positioning data is different than the second positioning data and (ii) the supplying means supplies the ignition signal indicates indicating that the ignition switch is off; and the control unit does not transmit the emergency signal to the service center when the start trigger occurs in cases that the supplying means supplies the ignition signal indicating the ignition switch is off.

2. The combination of claim 1, wherein
the first and second positioning data are taken in by the positioning data comparing unit from the GPS receiver without the use of a navigation apparatus.

3. A method for informing a failure of an ignition signal indicating status of an ignition switch in a vehicle having an air bag system, the ignition signal being supplied to the air bag system, the method comprising:
performing a first determination as to whether the ignition signal indicates that the ignition switch is off;
taking in first positioning data indicating a first position of the vehicle using a GPS receiver provided in the vehicle in cases that the first determination determines that the ignition signal indicates the ignition switch is off;
performing a second determination as to whether the ignition signal indicates that the ignition switch is off when a time period which exceeds a prescribed time period passes since acquiring the first positioning data;
taking in second positioning data indicating a second position of the vehicle using the GPS receiver in cases that the second determination determines that the ignition signal indicates the ignition switch is off;
determining whether the first positioning data and the second positioning data change from each other by more than a predetermined value;
determining a failure of the ignition signal when it is determined that the first positioning data and the second positioning data change from each other by more than the predetermined value; and
reporting to a user that the ignition signal has failed when it is determined that the first positioning data and the second positioning data change from each other by more than the predetermined value and that the ignition signal indicates that the ignition switch is off; wherein
the method cooperates with another method provided in the vehicle for transmitting to a service center an emergency call signal including positioning data of the vehicle when a start trigger occurs, on condition that the ignition signal indicates the ignition switch is on; and
the emergency call is not transmitted to the service center when the start trigger occurs in cases that the ignition signal indicates that the ignition switch is off.

4. The method of claim 3, wherein:
the positioning data are taken from the GPS receiver provided in the vehicle without using a navigation apparatus.

5. The combination of claim 1,
wherein the control unit is further configured to:
perform a first determination as to whether the ignition signal indicates that the ignition switch is off, and take in first positioning data indicating a first position of the vehicle using the GPS receiver, in cases that the first determination is made such that the ignition signal indicates that the ignition switch is off;
perform a second determination as to whether the ignition signal indicates that the ignition switch is off when a time period, which exceeds the prescribed time period, passes since acquiring the first positioning data, and take in second positioning data indicating a second position of the vehicle using the GPS receiver, in cases that the second determination is made such that the ignition signal indicates that the ignition switch is off; and
re-perform the first determination as to whether the ignition signal indicates that the ignition switch is off without taking in positioning data indicating a third position of the vehicle using the GPS receiver in cases that the second determination is made such that the ignition signal indicates that the ignition switch is on.

6. The combination of claim 5,
wherein, only when the second positioning data is taken, the positioning data comparing unit is configured to compare the second positioning data with the first positioning data, which is most recently taken after the first determination, which is most recently performed, is made such that the ignition signal indicates that the ignition switch is off.

7. The method of claim 3, further comprising:
returning to perform the first determination as to whether the ignition signal indicates that the ignition switch is off in cases that the second determination is made such that the ignition signal indicates that the ignition switch is on.

8. The method of claim 3, further comprising: performing a third determination as to whether an accessory signal is on before performing the first determination as to whether the ignition signal indicates that the ignition switch is on, wherein only in cases that the third determination is made such that the accessory signal is on, the first determination is performed; and performing, before performing the second determination as to whether the ignition signal indicates that the ignition switch is on, a fourth determination as to whether the accessory signal is on when a time period, which exceeds the prescribed time period, passes since acquiring the first positioning data, wherein in cases that the fourth determination is made such that the accessory signal is on, the second determination is performed, whereas in cases that the fourth determination is made such that the accessory signal is off, and the first determination as to whether the ignition signal indicates that the ignition switch is off is re-performed.

9. The combination of claim 1, wherein
the supplying means includes a communication line that connects the ignition switch with both the emergency call apparatus and the air bag system; and
the supplying means supplies the ignition signal indicating that the ignition switch is off, when a failure occurs in the communication line.

\* \* \* \* \*